(12) United States Patent
Prentice

(10) Patent No.: US 8,737,755 B2
(45) Date of Patent: May 27, 2014

(54) METHOD FOR CREATING HIGH DYNAMIC RANGE IMAGE

(75) Inventor: Wayne E. Prentice, Honeoye Falls, NY (US)

(73) Assignee: Apple Inc., Cupertino, CA (US)

( * ) Notice: Subject to any disclaimer, the term of this patent is extended or adjusted under 35 U.S.C. 154(b) by 511 days.

(21) Appl. No.: 12/644,040

(22) Filed: Dec. 22, 2009

(65) Prior Publication Data

US 2011/0150357 A1  Jun. 23, 2011

(51) Int. Cl.
- *G06K 9/40* (2006.01)
- *G06K 9/00* (2006.01)
- *H04N 5/235* (2006.01)
- *G06T 5/50* (2006.01)

(52) U.S. Cl.
CPC ............ *H04N 5/2355* (2013.01); *G06T 5/50* (2013.01); *G06T 2207/10144* (2013.01); *G06T 2207/20208* (2013.01)
USPC ............................ 382/254; 382/167; 382/274

(58) Field of Classification Search
CPC ............ G06T 2207/10144; G06T 2207/20208
USPC .................................. 382/167, 254, 276, 274
See application file for complete search history.

(56) References Cited

U.S. PATENT DOCUMENTS

| 3,971,065 A | 7/1976 | Bayer |
| 5,012,333 A | 4/1991 | Lee et al. |
| 5,506,619 A | 4/1996 | Adams, Jr. |
| 5,629,734 A | 5/1997 | Hamilton, Jr. |
| 5,652,621 A | 7/1997 | Adams, Jr. |
| 5,828,793 A | 10/1998 | Mann |
| 6,040,858 A | 3/2000 | Ikeda |
| 6,909,461 B1 | 6/2005 | Gallagher |
| 7,142,723 B2 | 11/2006 | Kang et al. |
| 7,593,037 B2 | 9/2009 | Matsumoto |
| 7,616,256 B2 | 11/2009 | Ward |
| 7,623,683 B2 * | 11/2009 | Chen et al. ............... 382/107 |
| 7,626,614 B1 | 12/2009 | Marcu |
| 2005/0275747 A1 * | 12/2005 | Nayar et al. ............. 348/362 |
| 2006/0119712 A1 | 6/2006 | Yamamoto |

(Continued)

FOREIGN PATENT DOCUMENTS

| EP | 0977432 | 2/2000 |
| EP | 1 225 756 A1 | 7/2002 |
| EP | 1437626 | 7/2004 |

OTHER PUBLICATIONS

Erik Reinhard, Erum Arif Khan, Ahmet Oguz Akya: "Color Imaging: Fundamentals and Applications", Chapter 13, High Dynamic Range Image Capture, Jul. 30, 2008, A K Peters, Ltd., Wellesley, Massachusetts, XP002630790, ISBN: 978-1-56881-344-8, p. 709-721, p. 733-734.

(Continued)

*Primary Examiner* — Anand Bhatnagar
*Assistant Examiner* — Soo Park
(74) *Attorney, Agent, or Firm* — Wong, Cabello, Lutsch, Rutherford & Brucculeri LLP

(57) ABSTRACT

A method for improving the dynamic range of a captured digital image, the method includes the steps of acquiring at a first and second image each at different effective exposures; computing from the first and second images a linear exposure shift; applying the exposure shift to the first image to match relative effective exposure of the second image; and computing a single high dynamic range image from the first and second images.

24 Claims, 6 Drawing Sheets

(56) References Cited

U.S. PATENT DOCUMENTS

| | | |
|---|---|---|
| 2006/0198623 A1 | 9/2006 | Ono |
| 2008/0174666 A1 | 7/2008 | Okada |
| 2008/0219581 A1 | 9/2008 | Albu |
| 2008/0219585 A1 | 9/2008 | Kasai |
| 2009/0002530 A1 | 1/2009 | Arai et al. |
| 2009/0046947 A1 | 2/2009 | Kobayashi |
| 2009/0153694 A1 | 6/2009 | Takayama |
| 2009/0175555 A1* | 7/2009 | Mahowald ............ 382/274 |
| 2009/0231445 A1 | 9/2009 | Kanehiro |
| 2009/0238435 A1* | 9/2009 | Shields ............ 382/133 |
| 2010/0046855 A1* | 2/2010 | Marcu et al. ............ 382/284 |
| 2010/0157078 A1* | 6/2010 | Atanassov et al. ......... 348/222.1 |

OTHER PUBLICATIONS

Paul E. Debevec, et al., "Recovering high dynamic range radiance maps from photographs", Proc. of SIGGRAPH 97, Computer Graphics Proceedings, Annual Conference Series, 1997, pp. 369-378.

PCT Search Report received in corresponding PCT Application No. PCT/US2010/061187, dated Apr. 19, 2011.

Office Action received in corresponding U.S. Appl. No. 12/644,039, dated Feb. 29, 2012.

Office Action received in corresponding U.S. Appl. No. 12/644,039, dated Aug. 15, 2012.

* cited by examiner

FIG. 2a ORIGINAL IMAGE
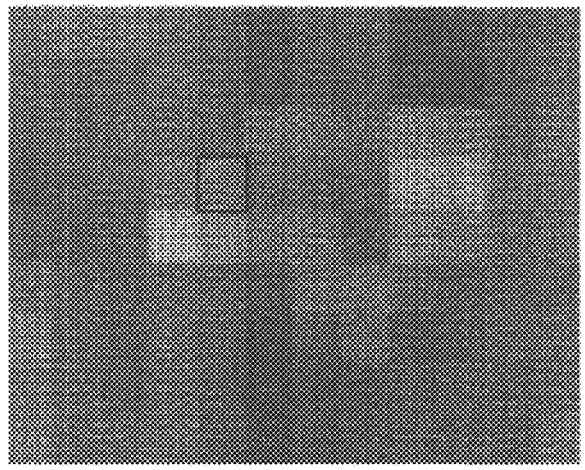
FIG. 2b PAXELIZED IMAGE
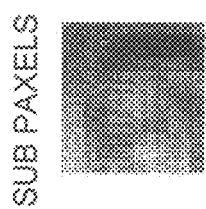
FIG. 2c SUB PAXELS

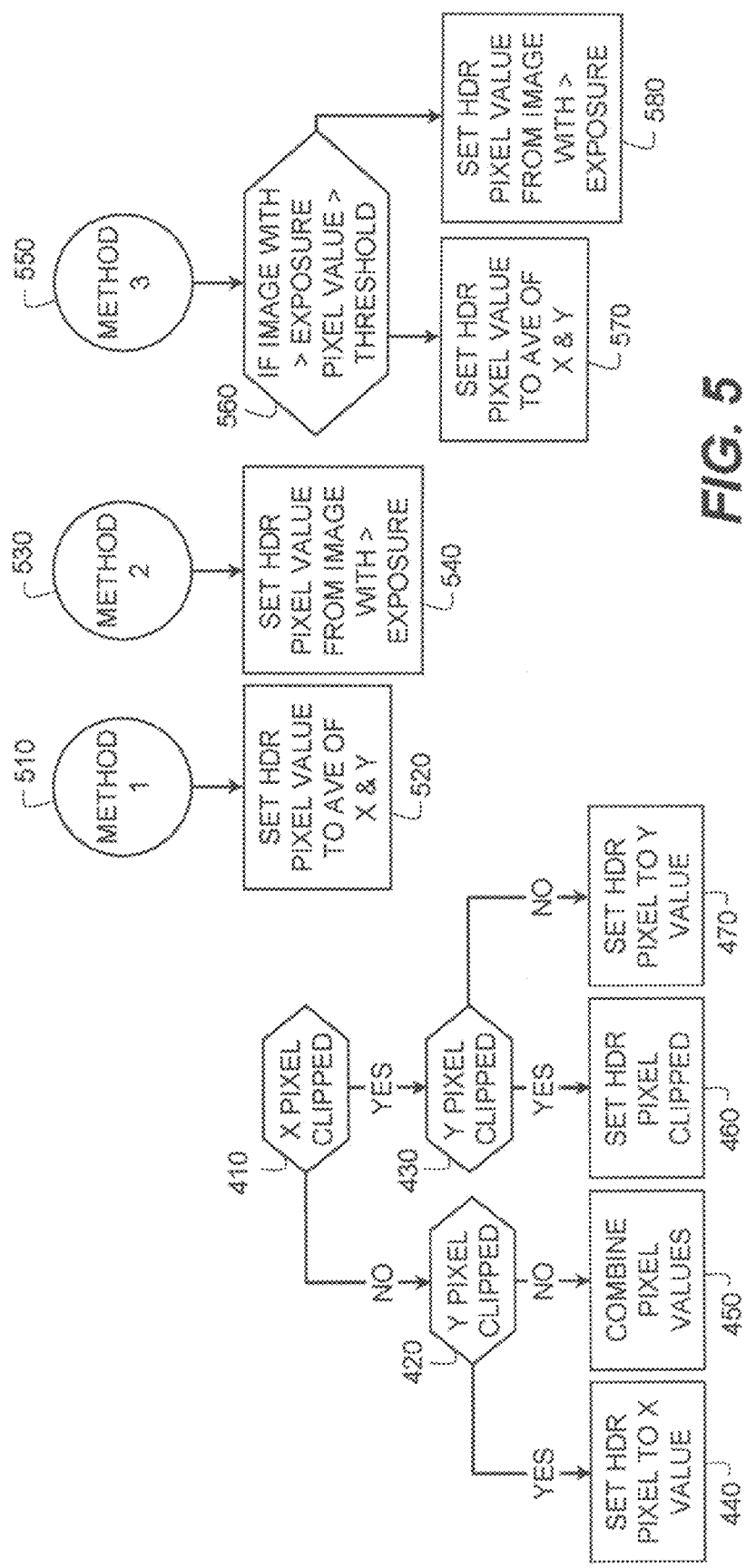

FIG. 7
(PRIOR ART)

METHOD FOR CREATING HIGH DYNAMIC RANGE IMAGE

CROSS REFERENCE TO RELATED APPLICATIONS

Reference is made to U.S. patent application Ser. No. 12/644,039, filed Dec. 22, 2009, by Wayne E. Prentice, et al., entitled "Creating an Image Using Still and Preview", the disclosure of which is herein incorporated by reference.

FIELD OF THE INVENTION

The present invention pertains to a method of combining multiple images with varying exposures into a single image with a larger dynamic range than any of the source images.

BACKGROUND OF THE INVENTION

The real world has a lot more brightness variation than can be captured by the sensors available in most cameras today. The radiance of a single scene may contain four orders of magnitude in brightness from shadows to fully lit regions. Typical CCD or CMOS sensors only capture about 256-1024 brightness levels.

This limited dynamic range problem has inspired many solutions in recent years. One method of capturing the full radiance of a static scene is to take multiple still exposures of the scene and then to combine them to create a High Dynamic Range (HDR) map. Dynamic range shows the ratio of a specified maximum level of a parameter to the minimum detectable value of that parameter. High dynamic range imaging allows a greater dynamic range of exposures than normal digital imaging techniques. For example, a high dynamic range image can accurately represent the wide range of intensity levels found in real scenes, ranging from direct sunlight to the dark shadows. In a normal digital imaging technique, either the dark region or the bright region becomes saturated, or almost saturated, so that the details in these regions become unrecognizable.

Typically, a digital camera has a limited dynamic range. With a given exposure setting, the digital camera may not be able to capture the details in a bright area in the scene since the bright area in the picture taken by the digital camera is saturated and represented as a uniform white region. Similarly, the details in a dark area in the scene may be captured as a uniform black region or a region where noise dominates the scene content. Increasing the exposure duration may allow the camera to capture more details in the dark region but lose more details near the bright region as the bright region expands. Reducing the exposure duration may allow the camera to capture more details in the bright region but lose more details near the dark region as the dark region expands.

Paul E. Debevec and Jitendar Malik (Recovering high dynamic range radiance maps from photographs, Proc. of SIGGRAPH 97, Computer Graphics Proceedings, Annual Conference Series, pp. 369-378, 1997) present a method to derive a response curve that relates the pixel image values and the natural logarithm of the product of irradiance and exposure duration. The response curve then can be used to recover high dynamic range radiance maps from series of images of a same scene taken at different exposure levels. In one example. Paul E. Debevec and Jitendar Malik map the logarithm of the radiance values into a gray scale image, which presents all the information in the series of images taken at the different exposure levels.

To obtain the response curve, Paul E. Debevec and Jitendar Malik formulated a quadratic objective function for least square minimization. The minimization process is formulated to solve for both the response curve and for the irradiances involved simultaneously. The quadratic objective function involves the second derivative of the response curve in order to obtain a smooth response curve.

Methods and apparatuses to derive at least one exposure function for high dynamic range imaging from images of different exposure durations are described by Marcu et al in U.S. Pat. No. 7,626,614. A method to generate a high dynamic range image from a plurality of images taken with a plurality of exposure durations described in U.S. Pat. No. 7,142,723 B2 by Kang et al includes: computing an exposure function from the plurality of images; and combining the plurality of images into a high dynamic range (HDR) image using the exposure function. A HDR image may be considered to be an image having a range of luminance (or other color intensity value or a combination of such values) which is greater than the average range of a plurality of images (and usually the HDR image has a range which is greater than the range of any image in the plurality of images which was used to created the HDR image). Both these method will calculate scene illuminance based upon known exposure durations.

U.S. Pat. No. 6,040,858 by Ikeda discloses the composite way by an image processing method of expanding the dynamic range by determining a saturated or noise region in an image signal and replacing the image signal with a proper image signal. A threshold value is set in units of colors on the basis of a standard image signal for each color, which is obtained upon sensing an image in a standard exposure and a non-standard image signal for each color, which is obtained upon sensing the image in a non-standard exposure. A saturated or noise region is determined by applying the threshold value set in units of colors to the standard image signal. A region determined as a saturated or noise region is replaced with the non-standard image signal.

The dynamic range of the captured image is limited not only by the image sensor. Optical flare also reduces the practical dynamic range of an image as well. Consider a lens with 1% veiling glare metric. Assuming an average scene reflectance of 18% implies that 0.18% of flare will superimposed upon the image. This effectively limits the amount of shadow detail or limits the dynamic range of an image to about 9 stops.

Methods to increase the dynamic range of images acquired by an image sensing device would allow such images to be rebalanced to achieve a more pleasing rendition of the image. Also, images with increased dynamic range would allow for more pleasing contrast improvements, such as described by Lee et al. in commonly assigned U.S. Pat. No. 5,012,333.

One method used for obtaining improved images with an image sensing device is exposure bracketing, whereby multiple images are captured at a range of different exposures, and one of the images is selected as a best overall exposure. This technique, however, does not increase the dynamic range of any individual image captured by the image sensing device.

Of the methods described, none incorporate an estimate of image flare that can dominate shadows and obscure image details in those regions.

Therefore, a need in the art exists for an improved solution to combining multiple images to form an image having increased dynamic range, without requiring special hardware or additional image sensors, without sacrificing performance for scenes not requiring high dynamic range, without requiring a knowledge of the exposure, and with dynamic range limitation caused by flare.

SUMMARY OF THE INVENTION

The object of this invention is to produce a high resolution image having increased dynamic range using at least two image captures with different exposures. The object is achieved by a method for using at least two images of a scene captured by the same image capture device to provide a high resolution image having increased dynamic range, the method comprising the steps of: (a) acquiring at a first and second image each at different effective exposures; (b) computing from the first and second images a linear exposure shift; (c) applying the exposure shift to the first image to match relative effective exposure of the second image; and (d) computing a single high dynamic range image from the first and second images.

A further advantage of the present invention is that a high resolution image having increased dynamic range that is not obscured by flare in shadow regions of the image.

A still further advantage of the present invention is that a high resolution image having increased dynamic range can be produced without knowledge of the capture settings.

This and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 2a, 2b and 2c are illustrations of image paxels;

FIG. 4 is a flow chart of the present invention;

FIG. 5 is a flow chart of the present invention;

FIG. 7 depicts a CFA pattern for use with the present invention.

DETAILED DESCRIPTION OF THE INVENTION

Because digital cameras employing imaging devices and related circuitry for signal capture and correction and for exposure control are well known, the present description will be directed in particular to elements forming part of or cooperating more directly with, method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

Figure 1:
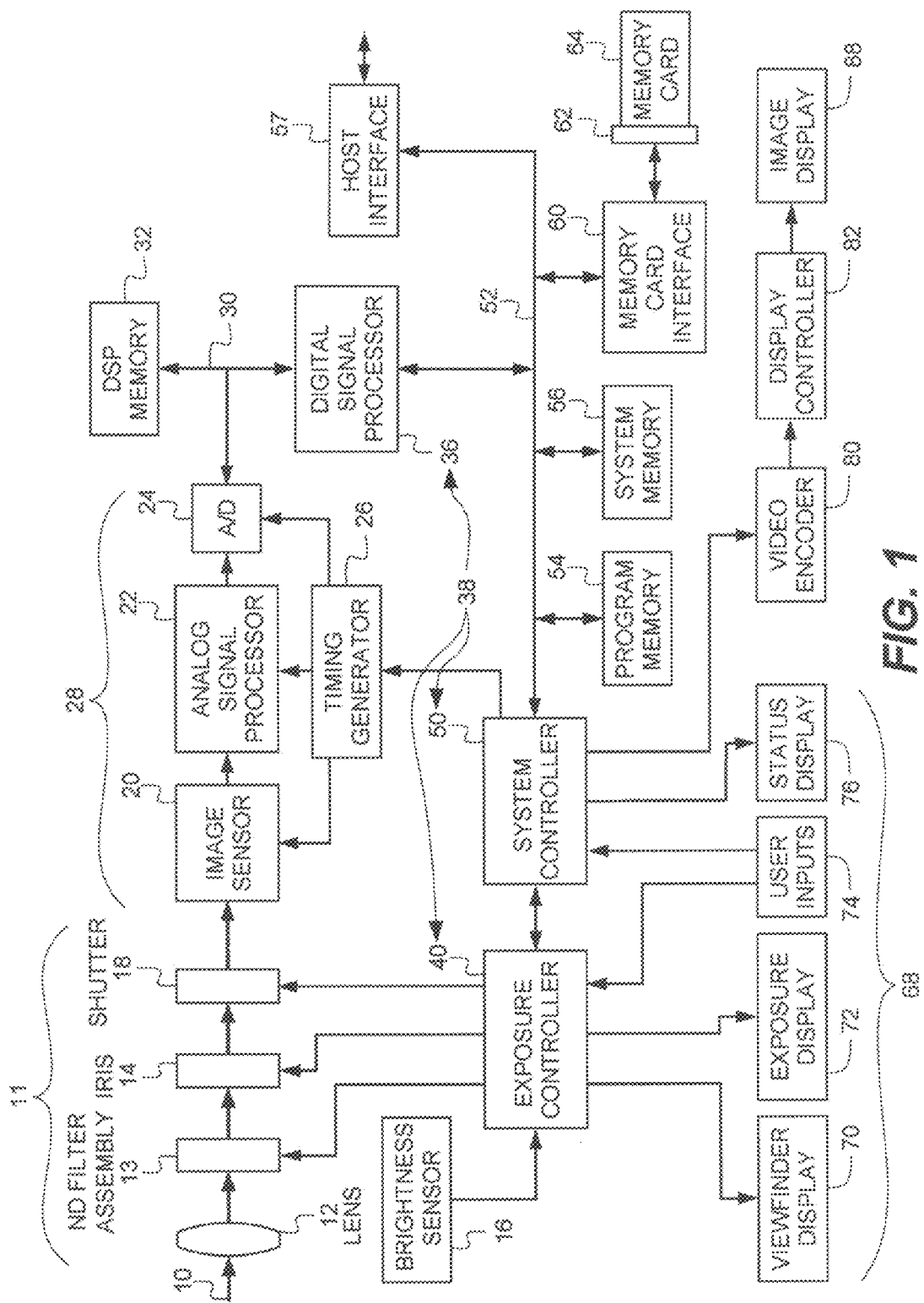
FIG. 1 is a block diagram of a conventional digital still camera system that can employ a conventional sensor and processing methods or the sensor and processing methods of the current invention.

Turning now to FIG. 1, a block diagram of an image capture device shown as a digital camera embodying the present invention is shown. Although a digital camera will now be explained, the present invention is clearly applicable to other types of image capture devices, such as imaging sub-systems included in non-camera devices such as mobile phones and automotive vehicles, for example. Light 10 from the subject scene is input to an imaging stage 11, where the light is focused by lens 12 to form an image on solid-state image sensor 20. Image sensor 20 converts the incident light to an electrical signal by integrating charge for each picture element (pixel). The image sensor 20 of the preferred embodiment is a charge coupled device (CCD) type or an active pixel sensor (APS) type. (APS devices are often referred to as CMOS sensors because of the ability to fabricate them in a Complementary Metal Oxide Semiconductor process). The sensor includes an arrangement of color filters, as described in more detail subsequently.

The amount of light reaching the sensor 20 is regulated by an iris block 14 that varies the aperture and the neutral density (ND) filter block 13 that includes one or more ND filters interposed in the optical path. Also regulating the overall light level is the time that the shutter block 18 is open. The exposure controller block 40 responds to the amount of light available in the scene as metered by the brightness sensor block 16 and controls all three of these regulating functions.

The analog signal from image sensor 20 is processed by analog signal processor 22 and applied to analog to digital (A/D) converter 24 for digitizing the sensor signals. Timing generator 26 produces various clocking signals to select rows and pixels and synchronizes the operation of analog signal processor 22 and A/D converter 24. The image sensor stage 28 includes the image sensor 20, the analog signal processor 22, the A/D converter 24, and the timing generator 26. The functional elements of image sensor stage 28 are separately fabricated integrated circuits, or they are fabricated as a single integrated circuit as is commonly done with CMOS image sensors. The resulting stream of digital pixel values from A/D converter 24 is stored in memory 32 associated with digital signal processor (DSP) 36.

Digital signal processor 36 is one of three processors or controllers in this embodiment, in addition to system controller 50 and exposure controller 40. Although this distribution of camera functional control among multiple controllers and processors is typical, these controllers or processors are combined in various ways without affecting the functional operation of the camera and the application of the present invention. These controllers or processors can comprise one or more digital signal processor devices, microcontrollers, programmable logic devices, or other digital logic circuits. Although a combination of such controllers or processors has been described, it should be apparent that one controller or processor is designated to perform all of the needed functions. All of these variations can perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in its memory 32 according to a software program permanently stored in program memory 54 and copied to memory 32 for execution during image capture. DSP 36 executes the software needed for practicing image processing shown in FIG. 18. Memory 32 includes any type of random access memory, such as SDRAM. A bus 30 comprising a pathway for address and data signals connects DSP 36 to its related memory 32, A/D converter 24 and other related devices.

System controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing exposure controller 40 to operate the lens 12, ND filter 13, iris 14, and shutter 18 as previously described, directing the timing generator 26 to operate the image sensor 20 and associated elements, and directing DSP 36 to process the captured image data. After an image is captured and processed, the final image file stored in memory 32 is transferred to a host computer via interface 57, stored on a removable memory card 64 or other storage device, and displayed for the user on image display 88.

A bus 52 includes a pathway for address, data and control signals, and connects system controller 50 to DSP 36, program memory 54, system memory 56, host interface 57, memory card interface 60 and other related devices. Host interface 57 provides a high-speed connection to a personal computer (PC) or other host computer for transfer of image data for display, storage, manipulation or printing. This interface is an IEEE 1394 or USB2.0 serial interface or any other suitable digital interface. Memory card 64 is typically a Compact Flash (CF) card inserted into socket 62 and connected to the system controller 50 via memory card interface 60. Other types of storage that are used include without limitation PC-Cards, MultiMedia Cards (MMC), or Secure Digital (SD) cards.

Processed images are copied to a display buffer in system memory 56 and continuously read out via video encoder 80 to produce a video signal. This signal is output directly from the camera for display on an external monitor, or processed by display controller 82 and presented on image display 88. This display is typically an active matrix color liquid crystal display (LCD), although other types of displays are used as well.

The user interface 68, including all or any combination of viewfinder display 70, exposure display 72, status display 76 and image display 88, and user inputs 74, is controlled by a combination of software programs executed on exposure controller 40 and system controller 50. User inputs 74 typically include some combination of buttons, rocker switches, joysticks, rotary dials or touch screens. Exposure controller 40 operates light metering, exposure mode, autofocus and other exposure functions. The system controller 50 manages the graphical user interface (GUI) presented on one or more of the displays, e.g., on image display 88. The GUI typically includes menus for making various option selections and review modes for examining captured images.

Exposure controller 40 accepts user inputs selecting exposure mode, lens aperture, exposure time (shutter speed), and exposure index or ISO speed rating and directs the lens and shutter accordingly for subsequent captures. Brightness sensor 16 is employed to measure the brightness of the scene and provide an exposure meter function for the user to refer to when manually setting the ISO speed rating, aperture and shutter speed. In this case, as the user changes one or more settings, the light meter indicator presented on viewfinder display 70 tells the user to what degree the image will be over or underexposed. In an automatic exposure mode, the user changes one setting and the exposure controller 40 automatically alters another setting to maintain correct exposure, e.g., for a given ISO speed rating when the user reduces the lens aperture, the exposure controller 40 automatically increases the exposure time to maintain the same overall exposure.

The ISO speed rating is an important attribute of a digital still camera. The exposure time, the lens aperture, the lens transmittance, the level and spectral distribution of the scene illumination, and the scene reflectance determine the exposure level of a digital still camera. When an image from a digital still camera is obtained using an insufficient exposure, proper tone reproduction can generally be maintained by increasing the electronic or digital gain, but the image will contain an unacceptable amount of noise. As the exposure is increased, the gain is decreased, and therefore the image noise can normally be reduced to an acceptable level. If the exposure is increased excessively, the resulting signal in bright areas of the image can exceed the maximum signal level capacity of the image sensor or camera signal processing. This can cause image highlights to be clipped to form a uniformly bright area, or to bloom into surrounding areas of the image. It is important to guide the user in setting proper exposures. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposures. Because of this flexibility, digital still cameras can have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating. With this in mind, the inherent ISO speed is a numerical value calculated from the exposure provided at the focal plane of a digital still camera to produce specified camera output signal characteristics. The inherent speed is usually the exposure index value that produces peak image quality for a given camera system for normal scenes, where the exposure index is a numerical value that is inversely proportional to the exposure provided to the image sensor.

The foregoing description of a digital camera will be familiar to one skilled in the art. It will be obvious that there are many variations of this embodiment that can be selected to reduce the cost, add features, or improve the performance of the camera. For example, an autofocus system is added, or the lens is detachable and interchangeable. It will be understood that the present invention is applied to any type of digital camera or, more generally, digital image capture apparatus, where alternative modules provide similar functionality.

Given the illustrative example of FIG. 1, the following description will then describe in detail the operation of this camera for capturing images according to the present invention. Whenever general reference is made to an image sensor in the following description, it is understood to be representative of the image sensor 20 from FIG. 1. Image sensor 20 shown in FIG. 1 typically includes a two-dimensional array of light sensitive pixels fabricated on a silicon substrate that convert incoming light at each pixel into an electrical signal that is measured. In the context of an image sensor, a pixel (a contraction of "picture element") refers to a discrete light sensing area and charge shifting or charge measurement circuitry associated with the light sensing area. In the context of a digital color image, the term pixel commonly refers to a particular location in the image having associated color values. The term color pixel will refer to a pixel having a color photoresponse over a relatively narrow spectral band. The terms exposure duration and exposure time are used interchangeably.

As sensor 20 is exposed to light, free electrons are generated and captured within the electronic structure at each pixel. Capturing these free electrons for some period of time and then measuring the number of electrons captured, or measuring the rate at which free electrons are generated, can measure the light level at each pixel. In the former case, accumulated charge is shifted out of the array of pixels to a charge-to-voltage measurement circuit as in a charge-coupled device (CCD), or the area close to each pixel can contain elements of a charge-to-voltage measurement circuit as in an active pixel sensor (APS or CMOS, sensor).

Figure 3:
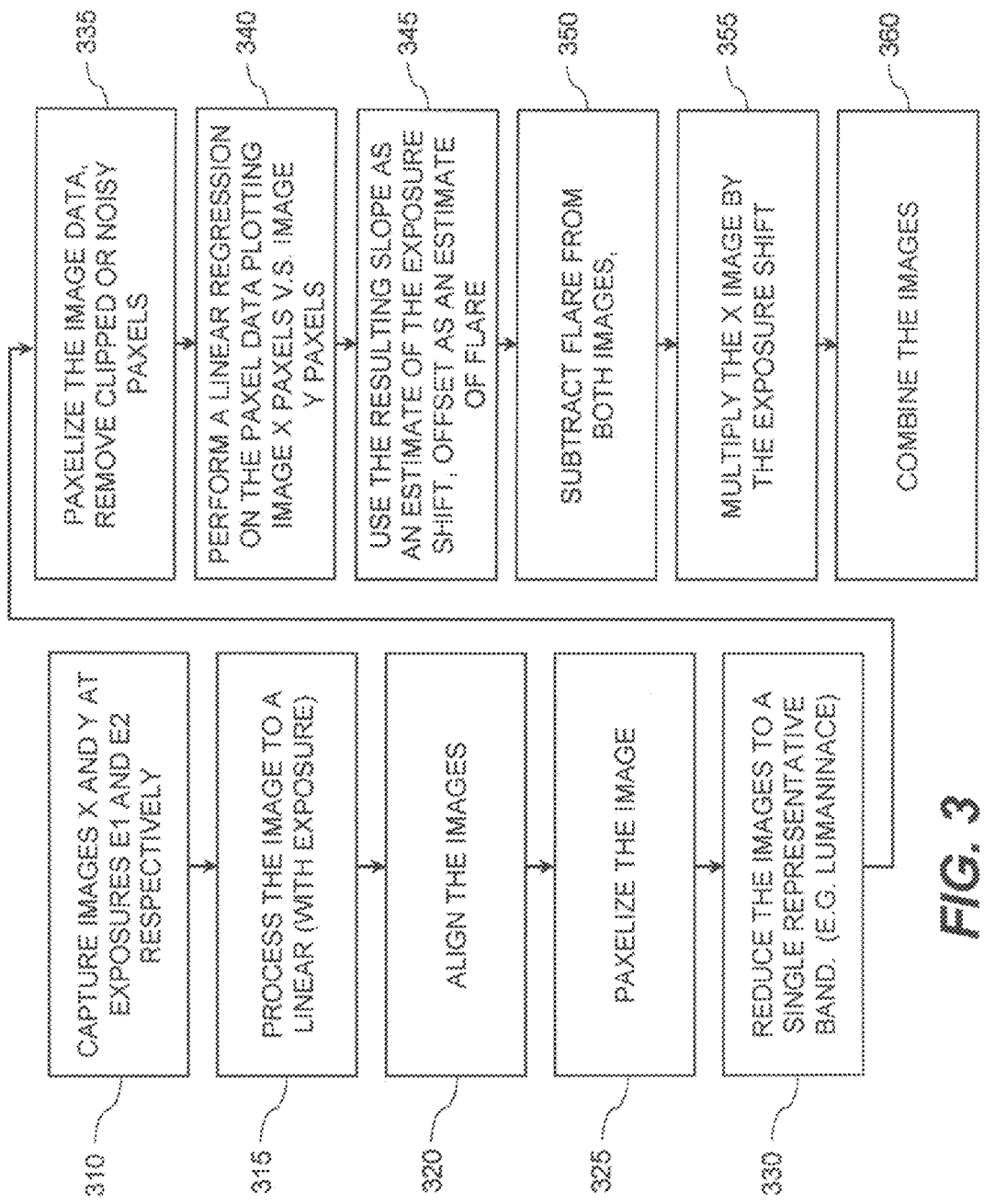
FIG. 3 is a flow chart of the present invention.

Referring to FIG. 3, a camera is used to capture two images with varying exposures 310. The invention herein can be used to combine two images at any exposure, best results will be achieved when one exposure is higher than the nominal exposure and the other is less than the nominal exposure. Further, the exposure must not be so different so that at least some common pixels are neither clipped nor buried in noise. Finally, the image should differ in exposure by means of exposure time. Changes in aperture can cause a change in the depth of field. This will cause the images to be different in more than just exposure and compromise the final image quality. Images that differ in ISO speed may use gain which can result in the higher gained image having less dynamic range and therefore unable to extend the dynamic range of the combined image.

Figure 7:
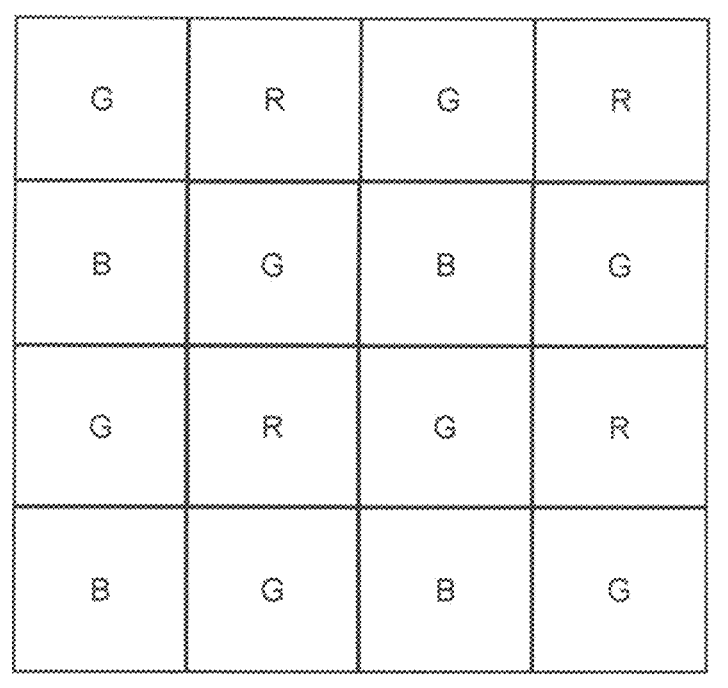

The exposure of an image can also be impacted by binning thus changing the effective exposure. As defined herein, effective exposure is defined as the exposure time of the image sensor for the given image, scaled by any binning factor used when reading out the image data from the sensor. For example, an image sensor using an exposure of 1/30 second for a binned image, along with a binning factor of 9×, generates an effective exposure of 9/30, or equivalently 3/10 second for the binned image. In this context, binning refers to the accumulation of charge from neighboring pixels prior to read out, and the binning factor refers to how many pixels have their charge accumulated into a single value which is read out. Binning typically occurs by accumulating charge from like pixels within the CFA pattern on the image sensor. For example, in FIG. 7, a binning factor of 4× could be achieved by accumulating the charge from all 4 red pixels shown in the illustration to form a single red pixel, and by similarly accumulating charge for blue pixels and for green pixels. Note that there are twice as many green pixels as blue or red in a Bayer pattern, and they would be accumulated in two independent groups to form two separate binned pixels.

To combine the two images into a single image with larger dynamic range, the input X and Y images must be in an exposure metric 315. That is to say the pixel values must be in a metric that can be traced back to relative exposure. This can be done a number of ways including assuming a common transfer function from a known color space. For images processed to a sRGB metric, the sRGB non-linearity and any additional tone scale must be inverted back to a linear space. Another method is to process image that are natively in the linear exposure metric. In the preferred embodiment, that metric is linear relative exposure. Further the X and Y images must be aligned 320 so that a given pixel in both images represents the same scene content. This may be done as simply by translation of the Y image to align with the X image. A more complex model would account for rotation and skew. In the preferred embodiment, motion vectors are computed for the Y image and used to remove both global and local motion from the Y image. Methods of motion detection are well-known to those of skill in the art, and any suitable method can be applied to detect moving regions in the live image.

The next step is to create an estimate of exposure and flare. The following relationship is assumed:

$$Y(x,y) = \text{ExposureDelta} \cdot X(x,y) + \text{FlareDelta} \qquad \text{Eq (1)}$$

In Eq. (1), (x,y) refer to pixel coordinates, in the preferred embodiment, X refers to the image of greater exposure, and Y refers to the image with lesser exposure. ExposureDelta and FlareDelta are the two unknown terms to be solved. For image data in a linear exposure metric, two images differing only in exposure can be related by a multiplicative term as represented by ExposureDelta. Remaining differences between the two images that are not modeled by a multiplicative term, such as differences in flare, can be modeled with an additional offset term, as given by FlareDelta.

In general, exposure differences between two images, and hence the ExposureDelta term, can be determined from the camera capture system, however due to variations in the performance of mechanical shutters, and other camera components, there can be a significant difference between the recorded exposure and the actual exposure of an image. To estimate exposure and flare, first the X and Y images are paxelized 325 or downsized to a small image representation (eg. 12×8 pixels). FIG. 2b depicts an example of a paxelized image. A paxel represents the average pixel value for a set of contiguous pixels. Next, the image needs to be reduced to a single representative band, preferably luminance 330. These pixels are then vectorized into a two column array where each row of the array contains one paxel value from the X(x,y) image and the corresponding paxel from the Y(x,y) image. In the preferred embodiment the image with the highest (brightest) exposure is assigned to the X array. This will result in the direct computation of a flare value that is subtracted from over exposed image to match the relatively lower exposed image that may have very little flare. Next, all X,Y pairs that contain clipped pixel values are removed. It is noted that a pixel value increases with increasing scene luminance to a point at which the pixel value no longer increases, but stays the same. This point is the clipped value. When a pixel is at the clipped value it is said to be clipped. Also X,Y pairs that are considered to be dominated by noise are removed 335. This threshold can beset based upon noise data for a given population of capture devices. Based upon Eq 1, a plot of a first image paxel values verses a second image paxel values will result in a straight line. A linear regression is then done on the remaining array data to compute a slope and offset relating the data in the first column of the array to the data in the second column of the array 340. The slope represents the linear exposure shift (ExposureDelta); the offset represents an estimate of global flare (FlareDelta). The next step is to convert the X, to match the second capture, Y, with respect to exposure and flare in accordance with Eq. (1) 345. In a preferred embodiment, if the offset term, FlareDelta, is positive, the FlareDelta term is subtracted from both the X image and the scaled Y 350. This results in the computation of an X image and scaled Y images having reduced flare.

Sometimes flare is better represented as a 2-d map. This 2-d map can be created using the same process just described but instead of computing flare globally, it can be computed for each paxel. A given paxel is computed by downsizing to a single paxel an area of adjacent pixels. Instead of reducing size down to a single paxel, it can instead be reduced down to a set of sub-paxels as depicted in FIG. 2c. A linear regression (which is well known in the art) is then done on this set of data to compute the offset term representing an estimate of the flare found at that paxel. This process is repeated for all paxels creating a low resolution flare map. Since the flare map is a smooth 2-d function it is well represented in this low resolution form, however to be used it is necessary to resize the map to match the resolution of the original image. The next step is to convert the X image to the match the Y image for exposure and flare in accordance with Eq. 1, step 355. This step will match the relative effective exposure of the X and Y images.

The images are combined 360 in accordance with details shown in FIG. 4. Referring to FIG. 4, if a pixel in the X image is clipped 410 and the corresponding pixel in the Y image is clipped 430 then corresponding pixel in the HDR image is set to a clipped value 460. If a pixel in the X image is clipped 410 and the corresponding pixel in the Y image is not clipped 430 then corresponding pixel in the HDR image is set to the corresponding Y image pixel value 470. If a pixel in the X image is not clipped 410 and the corresponding pixel in the Y image is clipped 420 then the corresponding pixel in the HDR is set to the corresponding X image pixel value 440. If a pixel in X image is not clipped 410 and the corresponding pixel in the Y image is not clipped 420 then corresponding pixel in the HDR image is set based upon combining the X and Y pixel 450 on one of the following methods as depicted in FIG. 5.

Referring to FIG. 5, the first method 510 of combining pixels is to simply average the pixel values 520. This average can also be a weighted average, where the weights are a function of the relative noise contained in each image. Method 2 is indicated when one of the captures is of lower resolution and lower exposure 530. In this case, averaging the two images would cause a loss of detail. To prevent this, the information from the higher exposure image is always used even when the low resolution image data is not clipped 540. Method 3 describes a method where the hard logic threshold is avoided in favor of a method that "feathers in" the lower resolution, lower exposure image 550. Pixel values from the higher exposed image are compared to a threshold 560. Pixels above the threshold are combined by averaging the pixels values from the two images 570. Pixel values below the threshold are combined using the pixel value from the image with greater exposure 580.

Figure 6:
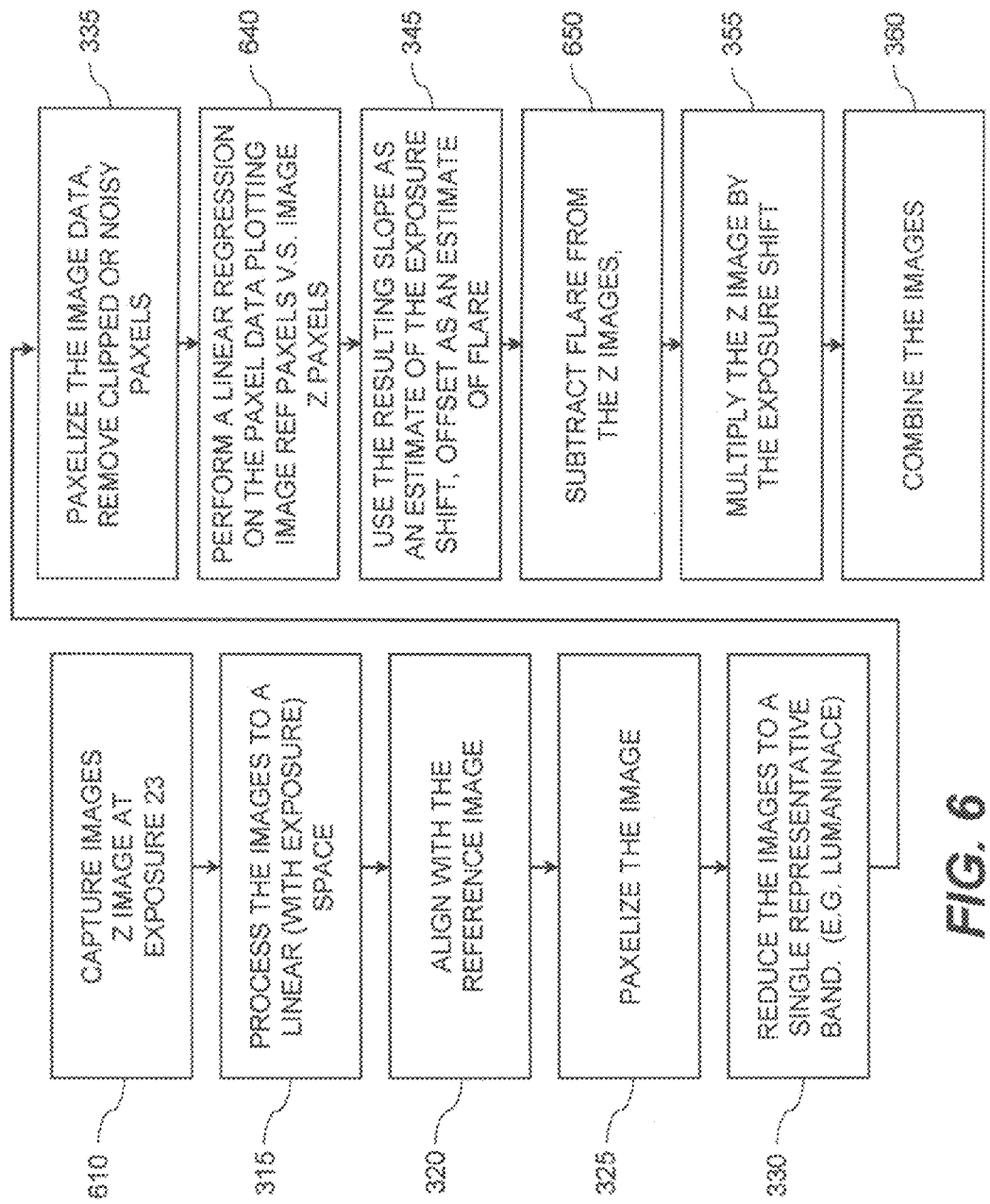
FIG. 6 is a flow chart of the present invention.

Once the combined image is created as in step 360, more images can be added to the stack to further increase the dynamic range. In this process, the combined high dynamic range (HDR) image, which is referred to as image ref. in step 640, and a new Z image are combined using the same processing as described for the X and Y images in FIG. 3 except steps 350 which is modified as shown in FIG. 6. Referring to FIG. 6, this step is renumbered as 650. The combined input HDR image has already been flare corrected so only the Z image needs to be flare corrected, step 650. It is noted that steps 610 and 640 use the term Z image instead of Y image since this portion of the invention involves the Z image being combined with the HDR image created in step 360.

Once the still images have been combined into an image having increased dynamic range, it can be rendered to an output space. For example, it can be rendered to a sRGB image by means of a tonescaling processing, such as described in U.S. Pat. No. 7,130,485 by Gindele et al., which is incorporated herein by reference. Of that step can be skipped if the image is displayed on a device inherently capable of handling and displaying a high dynamic range image.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

PARTS LIST

10 Light
11 Imaging stage
12 Lens
13 Filter block
14 Iris
16 Sensor block
18 Shutter block
20 Image Sensor
22 Analog signal processor
24 A/D converter
26 Timing generator
28 Sensor stage
30 Bus
32 DSP Memory
36 Digital signal processor
38 Processing Stage
40 Exposure controller
50 System controller
52 Bus
54 Program memory
56 System memory
57 Host interface
60 Memory card interface
62 Socket
64 Memory card
68 User interface
70 Viewfinder display
72 Exposure display
74 User inputs
76 Status display
80 Video encoder
82 Display controller
88 Image display

The invention claimed is:

1. A non-transitory program storage device comprising instructions stored thereon to cause one or more processors to:
    acquire first and second images, each captured at a different exposure, each comprising a plurality of pixels;
    downsize the first and second images, each downsized image comprising a plurality of image elements, wherein each image element in the downsized first image corresponds to a plurality of pixels in the first image and each image element in the downsized second image corresponds to a plurality of pixels in the second image, and wherein there is a one-to-one correspondence between image elements of the downsized first and second images;
    determine an exposure shift and an optical flare between the first and second images based, at least in part, on the downsized first and second images;
    apply the determined optical flare to the first and second images to obtain first and second modified images;
    apply the determined exposure shift to the first modified image to obtain an intermediate image; and
    combine the intermediate image and the modified second image to obtain an output image, the output image having a larger dynamic range than the first or second image.

2. The non-transitory program storage device of claim 1, wherein the instructions to cause one or more processors to acquire first and second images further comprise instructions to cause one or more processors to:
    determine whether the first and second images are in a linear exposure metric;

convert the first and second images into a linear exposure metric when it is determined that the first and second images are not in a linear exposure metric; and retain the first and second images unchanged when it is determined that the first and second images are in a linear exposure metric.

3. The non-transitory program storage device of claim 2, further comprising instructions to cause one or more processors to align the first and second images.

4. The non-transitory program storage device of claim 1, wherein the instructions to cause one or more processors to downsize the first and second images further comprise instructions to cause one or more processors to determine a value for each image element based, at least in part, on the plurality of pixels comprising the image element, wherein the first image's plurality of image element values correspond to the downsized first image and the second image's plurality of image element values correspond to the downsized second image.

5. The non-transitory program storage device of claim 4, wherein the instructions to cause one or more processors to downsize the first and second images further comprise instructions to cause one or more processors to ensure that each downsized image's image element values are in a single band.

6. The non-transitory program storage device of claim 5, wherein single band comprises a luminance band.

7. The non-transitory program storage device of claim 4 wherein the instructions to cause one or more processors to determine an exposure shift and an optical flare between the first and second images further comprise instructions to cause one or more processors to:

remove from each downsized image those image elements whose value is less than a first specified value; and remove from each downsized image those image elements whose value is greater than a second specified value, wherein the instructions to cause one or more processors to remove are executed prior to the instructions to cause the one or more processors to determine an exposure shift and an optical flare.

8. The non-transitory program storage device of claim 4 wherein the instructions to cause one or more processors to determine an exposure shift and an optical flare between the first and second images further comprise instructions to cause one or more processors to adjust one or more image element values to compensate for noise, wherein the instructions to cause one or more processors to adjust are executed prior to the instructions to cause the one or more processors to determine an exposure shift and an optical flare.

9. The non-transitory program storage device of claim 1, wherein the instructions to cause one or more processors to determine an exposure shift and an optical flare comprise instructions to cause one or more processors to perform a linear regression operation on the downsized first and downsized second images.

10. The non-transitory program storage device of claim 1, wherein the instructions to cause one or more processors to determine an optical flare comprise instructions to cause one or more processors to determine an optical flare for each image element.

11. The non-transitory program storage device of claim 1, wherein the instructions to cause one or more processors to combine the intermediate image and the modified second image comprise instructions to cause one or more processors to, for each intermediate image pixel:

set a corresponding pixel in the output image to a value equal to the intermediate image's pixel when the intermediate image's pixel is not clipped and a corresponding pixel in the modified second image is clipped;

set a corresponding pixel in the output image to a value equal to a combination of the intermediate image's pixel and the modified second image's corresponding pixel when the intermediate image's pixel is not clipped and the modified second image's corresponding pixel is not clipped;

set a corresponding pixel in the output image to a clipped value when the intermediate image's pixel is clipped and a corresponding pixel in the modified second image is clipped; and set a corresponding pixel in the output image to a value equal to the modified second image's pixel when the intermediate image's pixel is clipped and a corresponding pixel in the modified second image is not clipped.

12. An electronic device, comprising:

a display;

a memory operatively coupled to the display; and one or more processors operatively coupled to the display and the memory and configured to execute instructions stored in the memory to cause the electronic device to— acquire first and second images from the memory, each captured at a different exposure, each comprising a plurality of pixels, downsize the first and second images, each downsized image comprising a plurality of image elements, wherein each image element in the downsized first image corresponds to a plurality of pixels in the first image and each image element in the downsized second image corresponds to a plurality of pixels in the second image, and wherein there is a one-to-one correspondence between image elements of the downsized first and second images, determine an exposure shift between the first and second images based, at least in part, on the downsized first and second images;

apply the determined optical flare to the first and second images to obtain first and second modified images apply the determined exposure shift to the first image to obtain an intermediate image, and combine the intermediate image and the second image to obtain an output image, the output image having a larger dynamic range than the first or second image.

13. The electronic device of claim 12, wherein the instructions stored in the memory to cause the one or more processors to determine an exposure shift further comprise instructions to cause the one or more processors to determine an optical flare between the first and second images based, at least in part, on the downsized first and second images; and the instructions stored in the memory to cause the one or more processors to apply the determined exposure shift to the first image comprise instructions to cause the one or more processors to apply the determined optical flare to the first and second images before the determined exposure shift is applied.

14. A method to combine images, comprising:

acquiring first and second images, each captured at a different exposure, each having a plurality of pixels;

downsizing the first and second images, each downsized image having a plurality of image elements, wherein each image element in the downsized first image corresponds to a plurality of pixels in the first image and each image element in the downsized second image corresponds to a plurality of pixels in the second image, and wherein there is a one-to-one correspondence between image elements of the downsized first and second images;

determining an exposure shift and an optical flare between the first and second images based, at least in part, on the downsized first and second images;

applying the determined optical flare to the first and second images to obtain first and second modified images;

applying the determined exposure shift to the first modified image to obtain an intermediate image; and combining the intermediate image and the modified second image to obtain an output image having a larger dynamic range than the first or second image.

15. The method of claim 14, wherein the act of acquiring first and second images further comprises:

determining whether the first and second images are in a linear exposure metric;

converting the first and second images into a linear exposure metric when it is determined that the first and second images are not in a linear exposure metric; and retaining the first and second images unchanged when it is determined that the first and second images are in a linear exposure metric.

16. The method of claim 15, further comprising aligning the first and second images.

17. The method of claim 14, wherein the act of downsizing the first and second images further comprise determining a value for each image element based, at least in part, on the plurality of pixels comprising the image element, wherein the first image's plurality of image element values correspond to the downsized first image and the second image's plurality of image element values correspond to the downsized second image.

18. The method of claim 17, wherein the act of downsizing the first and second images further comprises ensuring that each downsized image's image element values are in a single band.

19. The method of claim 18, wherein the single band comprises a luminance band.

20. The method of claim 17, wherein the act of determining an exposure shift and an optical flare between the first and second images further comprises:

removing from each downsized image those image elements whose value is less than a first specified value; and removing from each downsized image those image elements whose value is greater than a second specified value, wherein the act of removing is performed prior to the act of determining an exposure shift and an optical flare.

21. The method of claim 17, wherein the act of determining an exposure shift and an optical flare between the first and second images further comprises adjusting one or more image element values to compensate for noise, wherein the act of adjusting is performed prior to the act of determining an exposure shift and an optical flare.

22. The method of claim 14, wherein the act of determining an exposure shift and an optical flare comprises performing a linear regression operation on the downsized first and downsized second images.

23. The method of claim 14, wherein the act of determining an optical flare comprises determining an optical flare for each image element.

24. The method of claim 14, wherein the act of combining the intermediate image and the modified second image comprises, for each intermediate image pixel:

setting a corresponding pixel in the output image to a value equal to the intermediate image's pixel when the intermediate image's pixel is not clipped and a corresponding pixel in the modified second image is clipped;

setting a corresponding pixel in the output image to a value equal to a combination of the intermediate image's pixel and the modified second image's corresponding pixel when the intermediate image's pixel is not clipped and the modified second image's corresponding pixel is not clipped;

setting a corresponding pixel in the output image to a clipped value when the intermediate image's pixel is clipped and a corresponding pixel in the modified second image is clipped; and setting a corresponding pixel in the output image to a value equal to the modified second image's pixel when the intermediate image's pixel is clipped and a corresponding pixel in the modified second image is not clipped.

\* \* \* \* \*